Figure 1:
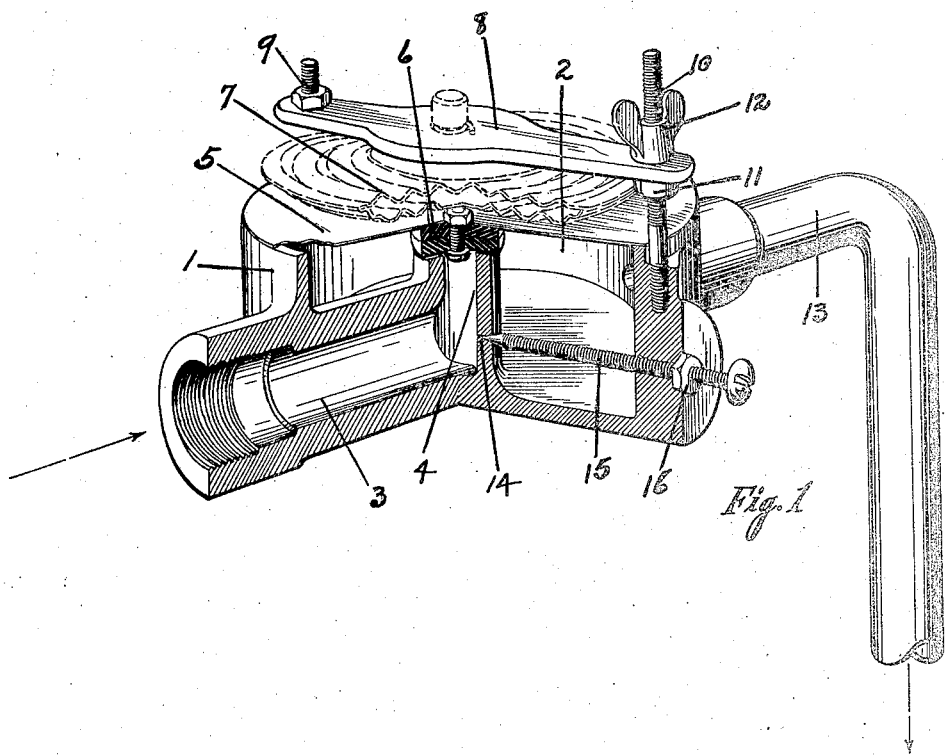

March 8, 1927.　　　　H. W. HART　　　　1,619,931

AUTOMATIC GAS FEED

Filed June 8, 1926

INVENTOR.
Harold W. Hart
BY
ATTORNEY

Patented Mar. 8, 1927.

1,619,931

UNITED STATES PATENT OFFICE.

HAROLD W. HART, OF LOS ANGELES, CALIFORNIA.

AUTOMATIC GAS FEED.

Application filed June 8, 1926. Serial No. 114,389.

My invention relates to a device for automatically regulating the flow of gas from the supply pipe to the place of combustion, and while it is particularly well adapted to control the gas flow to the gas burner or heater of an incubator or brooder used in connection with the raising of chickens, evidently it can be used in connection with any gas supply where it is desired to maintain a pilot light and to control the main supply of gas to the burner as needed to maintain a desired temperature.

In order to explain my invention, I have shown a practical embodiment thereof on the accompanying sheet of drawing, in which,—

The figure is a perspective view of an automatic gas feed device, with parts cut out to show the interior construction and arrangement.

Referring in detail to the drawing, the device as shown in the drawing, can be used with either side up, and comprises a main body, 1, with chamber, 2, therein, with a gas inlet pipe 3, formed as a part thereof and extended into the center of the body, 1, and chamber, 2, and terminating with an L-outlet, 4, discharging into the chamber 2, as will be clear from the drawing. A thin sheet member, or diaphragm, 5, covers one side of the body, and has mounted in its center, within the chamber, 2, a valve member, 6, adapted to seat upon the end of said L-outlet, 4, so as to close the same, said diaphragm being sufficiently flexible to permit said valve member to move away from said outlet to permit the inflow of gas to the chamber 2, unless said valve member is otherwise pressed down upon said outlet member, 4. In order to automatically control said outlet, I provide a thermostat, 7, mounted adjacent said diaphragm, 5, and adapted when expanded to press said diaphragm sufficiently to close said valve member 6, down upon said outlet and thus shut off the gas supply flowing into the chamber 2. Said thermostat is secured by means of a cross plate, 8, and two bolts, 9 and 10, the bolt 10 being supplied with a nut, 11, and thumb screw, 12, whereby to adjust the position of said thermostat relative to the diaphragm, 5, and in order to get the desired results. The thermostat is expanded under a rise in temperature in the room or chamber in which the device is placed, and is well understood and I do not claim any particular type of thermostat.

A pipe, 13, leads from the chamber 2, to any desired place of consumption, which is usually to a burner, or heater of some kind and not necessary to be shown, as it forms no part of my invention.

In order to provide a supply of gas for a pilot light, I have pierced the L-outlet 4, as at 14, and have provided a needle valve screw, 15, through the side of the body, 1, with nut 16 for locking it in adjusted position, said needle valve being adapted to permit a small supply of gas to escape from the main supply, into chamber 2, and from thence to pass through the supply pipe, 13, to the pilot, as will be understood.

Thus it will be seen that I have provided a very simple, practical and economical device for automatically regulating the supply of gas to a burner, or other place of consumption, and without any by-pass pipes and separate construction, have made simple and practical provision for a small gas supply to a pilot light through the regular pipe.

I do not limit my invention to the details shown for illustrative purposes except as I may be limited by the hereto appended claims.

I claim:

1. In a device of the character referred to, a body having a chamber therein, one outside wall of said body being a thin flexible member, an inlet pipe extended into said chamber and having an open end adjacent said thin flexible wall member, a valve element attached to the inside of said thin flexible wall member over and adapted to be moved onto and away from said open end of said inlet pipe, outlet for pipe connection from said chamber, and a thermostat element mounted on the outside of said thin flexible outside wall member and adjustable toward and from it and means for adjusting and holding the same thereagainst, whereby expansion and contraction of said thermostat element flexes said thin outside wall member and opens and closes the open end of said inlet pipe to said chamber.

2. In a device of the character referred to, a body of cylindrical form having one side wall of thin flexible sheet metal, an integral inlet pipe extended into the middle of said body and having an open discharge end adjacent the inside of said thin wall, a valve member on the inside of said thin wall and positioned to seat upon the open discharge end of said inlet pipe, said inlet pipe having a small opening into the chamber of said body, a needle valve through said body to said small opening for controlling the same, pipe connections for outlet from the chamber in said body, a thermostat mounted contiguous to the outside of said thin outside wall of said body. a cross member and adjustment screws for adjusting the thermostat to and from said thin outside wall member of said body, whereby the expansion and contraction of said thermostat moves said thin outside wall member and operates said valve member on the inlet pipe, substantially as shown and described.

Signed at Los Angeles, Los Angeles County, California, this 3rd day of June, 1926.

HAROLD W. HART.